C. A. LINDBERG.
VACUUM CLEANER.
APPLICATION FILED FEB. 26, 1910.
1,037,027.
Patented Aug. 27, 1912.
2 SHEETS—SHEET 2.
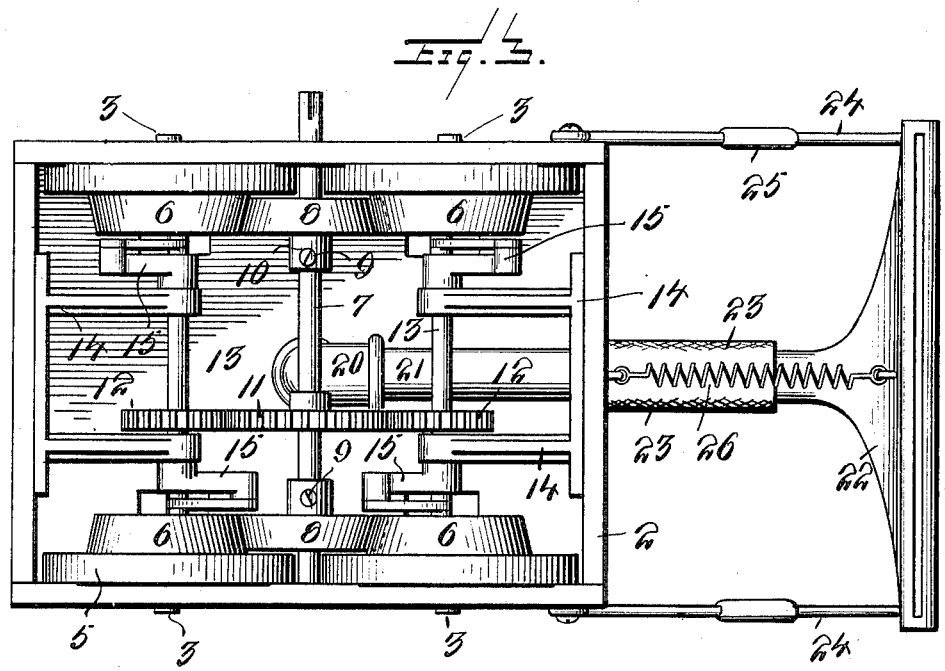
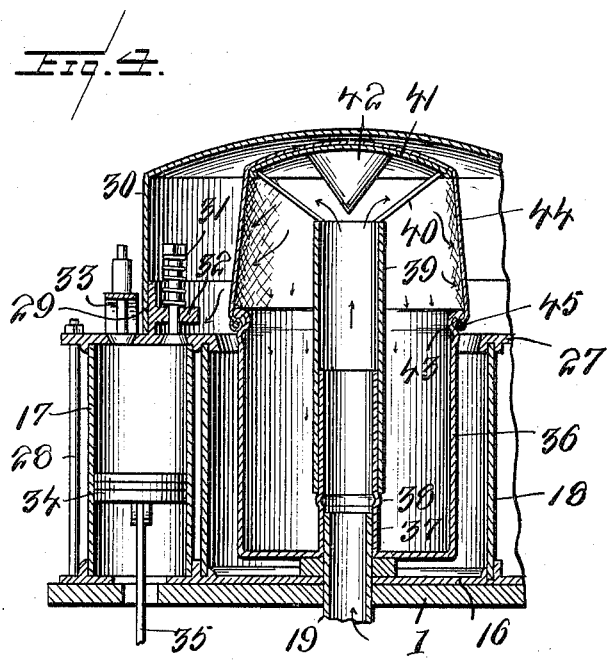
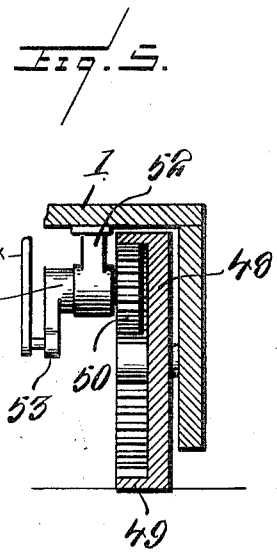
Inventor
Charles A. Lindberg
By Victor J. Evans
Attorney
Witnesses
E. Q. Ruppert
Wm Bagger

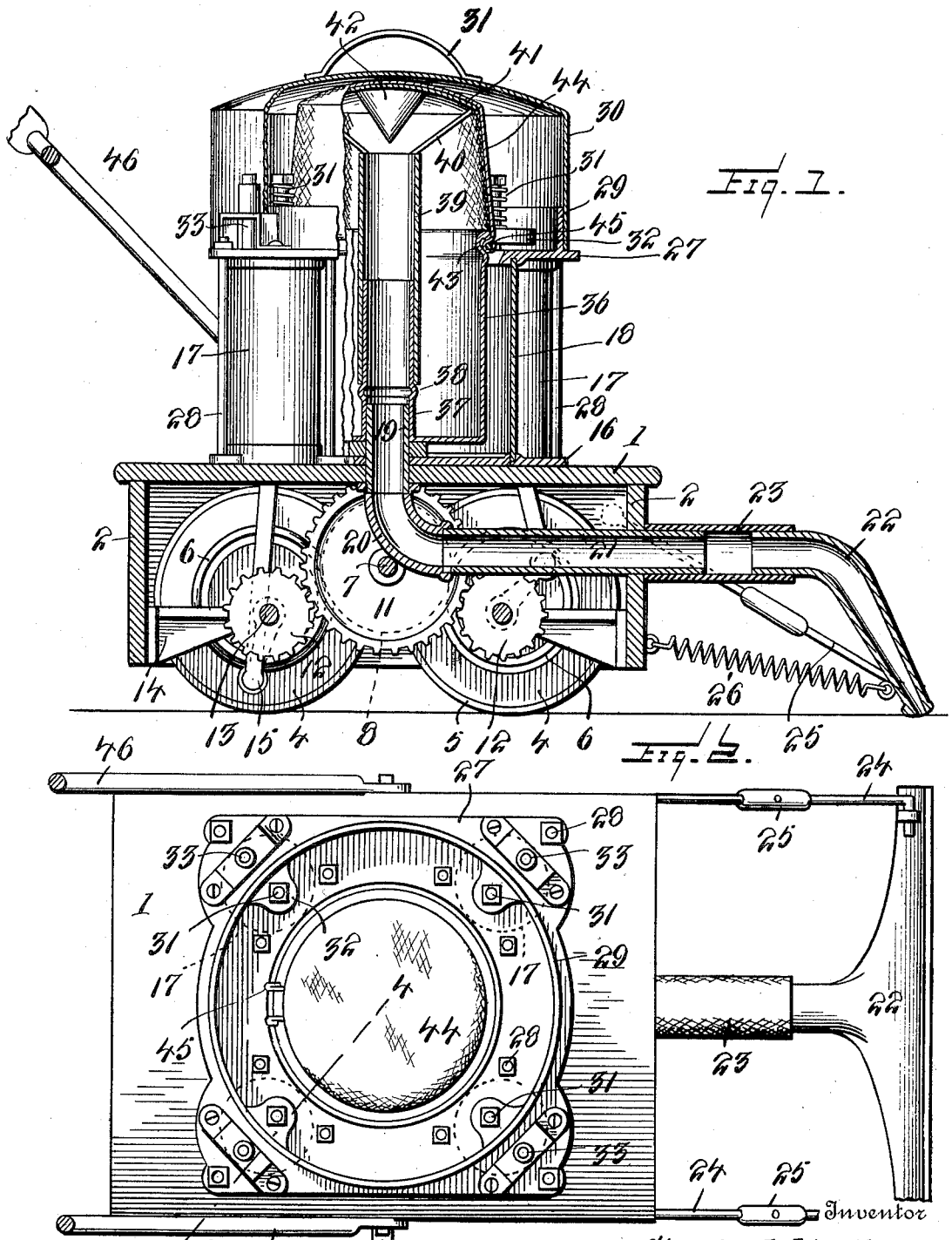

UNITED STATES PATENT OFFICE.

CHARLES A. LINDBERG, OF BRADFORD, PENNSYLVANIA.

VACUUM-CLEANER.

1,037,027.  Specification of Letters Patent.  Patented Aug. 27, 1912.

Application filed February 26, 1910. Serial No. 546,151.

*To all whom it may concern:*

Be it known that I, CHARLES A. LINDBERG, a citizen of the United States of America, residing at Bradford, in the county of McKean and State of Pennsylvania, have invented new and useful Improvements in Vavuum-Cleaners, of which the following is a specification.

This invention relates to vacuum cleaners, and it has for its object to produce a device of this class which shall possess superior advantages in point of simplicity, durability and general efficiency.

With these and other ends in view, which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a sectional elevation of a machine constructed in accordance with the invention. Fig. 2 is a top plan view of the same. Fig. 3 is a bottom plan view. Fig. 4 is a sectional view taken on the plane indicated by the line 4—4 in Fig. 2. Fig. 5 is a sectional detail view illustrating a slight modification.

Corresponding parts in the several figures are denoted by like characters of reference.

The frame structure of the improved machine includes a platform 1 having downward extending flanges 2, 2 combining with the platform to form a box-like casing, the side members of which afford bearings for stub axles 3 upon which the supporting wheels 4 are mounted, said supporting wheels being preferably provided with rubber tires 5 to avoid slipping. Each of the supporting wheels is provided with a friction rim 6 which is preferably slightly beveled or truncated, as shown.

A shaft 7, which is supported for rotation in the side members of the casing, carries friction disks 8 which are movably supported by set screws 9 extending through the hubs or collars 10 of said friction disks, so that the latter may be held tightly in engagement with the friction rims 6 of the supporting wheels from which motion will in this manner be transmitted to the shaft 7. The latter carries a spur wheel 11 meshing with pinions 12 upon shafts 13 which are supported for rotation in bearings formed by brackets 14 that are firmly secured upon the front and rear flanges of the casing. Each of the shafts 13 is provided with terminal cranks 15, one at each end, said cranks being disposed adjacent to but free from contact with the friction rims of the supporting wheels.

Supported upon the platform 1 is a base member 16 upon which four pump cylinders 17 are supported in vertical or upright position, as well as a cylindrical casing 18. The casing 18 has a central aperture through which a tube 19 extends, said tube being also extended through the platform 1 and connected at its lower end by an elbow 20 with the inlet tube 21 which latter extends through the front flange of the casing, said inlet tube being connected with the mouth piece 22 by a flexible connection, such as a piece of rubber hose 23. The mouth piece, which is of a width substantially equal to that of the casing, is connected with said casing by means of brace hooks 24, each including a turn buckle 25 whereby said hook members may be adjusted to cause the mouth piece to bear against the surface to be cleaned with varying degrees of tension. The mouth piece is also connected with the casing by means of a tension spring 26, whereby said mouth piece is held efficiently in contact with the surface during the rearward movement of the machine, the movement in a forward direction having an obvious tendency to bring the mouth piece into frictional engagement with the surface to be cleansed.

The pump cylinders 17 are disposed adjacent to the four corners of the platform, surrounding the casing 18, and a tightly fitting cap piece 27, resting upon the upper edge of the casing 18, is provided to constitute a tightly fitting cover for each of the pump cylinders 17, said cap piece being connected with the base 16 by bolt members 28. The cap piece which obviously extends circumferentially beyond the upper edge of the casing 18 is provided with an upstanding annular flange 29 to support a detachable cover 30 having a handle 31[a] whereby said cover, which constitutes a tightly fitting closure, may be manipulated.

Spring-actuated valves 31, which are supported in brackets 32, extending inwardly from the flange 29 open into the cylinders 17; and the latter are provided outside of the cover 30 of the casing with discharge apertures which may be closed by outwardly opening check valves 33. Pistons 34 operating in the respective cylinders are connected by link stems 35 with the cranks 15 at the ends of the respective shafts 13.

Supported upon the tube 19 within the cylindrical casing 18 is a receptacle 36 having a central tube 37 engaging the tube 19, and the tube 37 is provided with an annular bead 38 to support a tubular extension 39 having at its upper end divergent rods 40 supporting a deflector 41 which is in the nature of a cap having an under concaved face upon which a conical spreader 42 is supported. The receptacle 36 is provided adjacent to its upper edge with an exterior groove or annular recess 43 for the convenient attachment of a strainer bag 44 formed preferably of textile material and supported in inverted position upon the deflector 41, said bag being provided at the edge thereof with a binding wire 45 which may be of a resilient nature so as to fit and lie snugly within the groove 43.

A handle supporting yoke 46 is pivotally connected with the frame or casing of the machine in the usual well known manner.

It will readily appear from the foregoing description that when the machine is trundled over a floor, carpet or other surface to be cleaned, the mouth piece will be held in contact with such surface, and the rotation of the supporting wheels will impart rotary motion through the shaft 7 to the shafts 13 having cranks 15 whereby the pump pistons are actuated, said pistons serving on their downstroke to create suction in the upper ends of the cylinders 17 and thence through the casing 18, strainer bag 44, supporting tube 19, inlet tube 21 and through the mouth piece, which will thus take up all dirt particles and carry them forcibly through the several tubes 21, 19, 37 and 39, until the dust-laden air impinges upon the spreader 42 and the deflector 41, the dust particles and impurities being deflected into the receptacle 36, while the filtered air will enter the pump cylinders to be subsequently expelled therefrom by the upstroke of the pistons. The accumulated dirt may be readily discharged by removing the cover 30 and the strainer bag, as well as the tube 39 carrying the deflector, after which the receptacle 36 may be taken out and emptied.

Under the slight modification illustrated in Fig. 5 of the drawings, the supporting wheels, here designated by 48, are provided with internally toothed flanges 49 meshing with pinions 50 upon shafts 51 that are supported for rotation in brackets 52 upon the underside of the platform 1, each of the shafts 51 being provided with a crank 53 connected with the lower end of the pitman 54, the upper end of which is connected with a pump piston.

The improved device, as will be seen from the foregoing description, is very simple in construction and it has practically proven to be thoroughly efficient for the purposes for which it is provided. Under some circumstances it may be desired to operate the pumps by means of a crank 54 shown in dotted lines in Fig. 2 as being connected with a non-circular end of the shaft 7; while the pumps are thus operated, the casing may be supported stationary upon a suitable base, and the mouth piece may be detached from the brace members 24 and connected with the inlet by a flexible hose of suitable length to enable the mouth piece to be utilized for cleaning walls, ceilings and the like.

Having thus described the invention, what is claimed as new, is:—

1. In a cleaning device of the character described, a wheel supported frame structure, a filter casing and suction producing means supported thereon, said suction producing means having communication with the filter casing and an outlet to the atmosphere, an inlet tube communicating with the filter casing, a mouth piece upon said inlet tube, a flexible connection between the mouth piece and the inlet tube, adjustable brace members connecting the mouth piece with the frame structure, and a tension spring connecting the mouth piece with the frame structure.

2. In a cleaning device of the character described, a wheel supported frame structure, a filter casing, and suction producing means supported thereon, said suction producing means having communication with the filter casing, and an outlet to the atmosphere, an inlet tube communicating with the filter casing, a mouth piece upon said inlet tube, a flexible connection between the mouth piece and the inlet tube, brace hooks connecting the mouth piece with the frame structure, each of said brace hooks including a turn buckle for varying the length thereof, and a tension spring connecting the mouth piece with the frame structure.

In testimony whereof I affix my signature in presence of two witnesses.

CHARLES A. LINDBERG.

Witnesses:
R. M. SMITH,
BENNETT S. JONES.